March 1, 1927.

M. L. WEBB

WIND TURBINE

Filed Sept. 14, 1925    2 Sheets-Sheet 1

1,619,643

Inventor

Martin L. Webb

By C.A.Snow&Co

Attorneys

March 1, 1927.

M. L. WEBB

WIND TURBINE

Filed Sept. 14, 1925

Inventor
Martin L. Webb
By C. A. Snow & Co
Attorneys

Patented Mar. 1, 1927.

1,619,643

UNITED STATES PATENT OFFICE.

MARTIN L. WEBB, OF GARDEN CITY, KANSAS.

WIND TURBINE.

Application filed September 14, 1925. Serial No. 56,305.

This invention has reference to wind motors, the primary object of the invention being to provide a windwheel constructed in such a way that a partial vacuum will be produced at the forward side of the wheel prior to the contact of the air against the blades of the wheel, to the end that the vacuum will produce a pulling force assisting the wind pressure in revolving the wheel.

Another object of the invention is to provide adjustable blades curved in such a way that they will offer the least resistance, while in operation, novel means being provided for adjusting the blades to various angles with respect to the axis of rotation, thereby adapting the device for various purposes and permitting its use under varying wind pressures.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawings.

Figure 1:
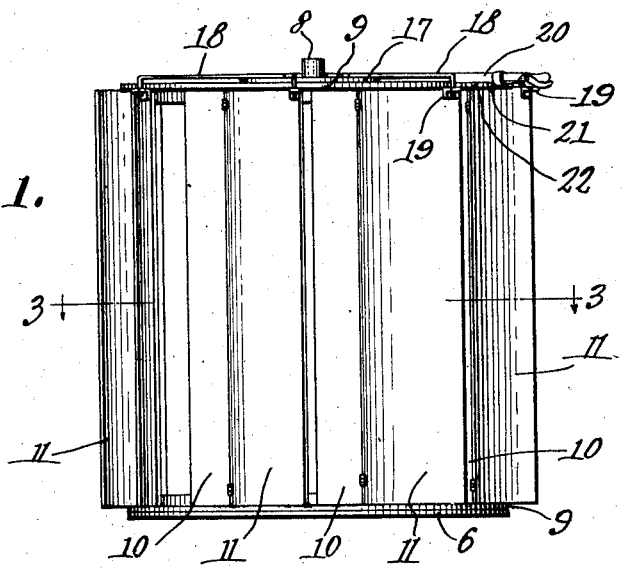
Figure 1 is a side elevational view of a wind-wheel constructed in accordance with the invention.

Referring to the drawings in detail, the device includes an outer casing embodying an upper circular member 5 and a lower circular member 6, each of which being provided with arms 7 provided with openings to accommodate the shaft 8.

Circular angle bars 9 are secured to the circular members 5 and 6, and provide means for securing the bars 10 to the circular members which bars 10 hold the circular members in proper spaced relation with each other at all times.

Hingedly connected with each of the bars 10 is a blade 11, which blades are slightly curved to conform to the curvatures of the circular members, the blades being of widths to close the spaces between adjacent bars 10, should it be desired to close the outer casing.

The wind-wheel proper embodies an upper disk 12 and a lower disk 13, which disks are provided with inwardly extended central flanges 14 affording means whereby the disks may be secured to the shaft 8 in such a way that movement of the shaft will result in a relative movement of the wind-wheel or vice versa.

Curved blades 15 have their ends connected to the disks 12 and 13 for holding the disks in proper spaced relation with each other, the inner portions of the blades being cut away as at 16 to permit air to pass therethrough at a point adjacent to the shaft 8.

Figure 2:
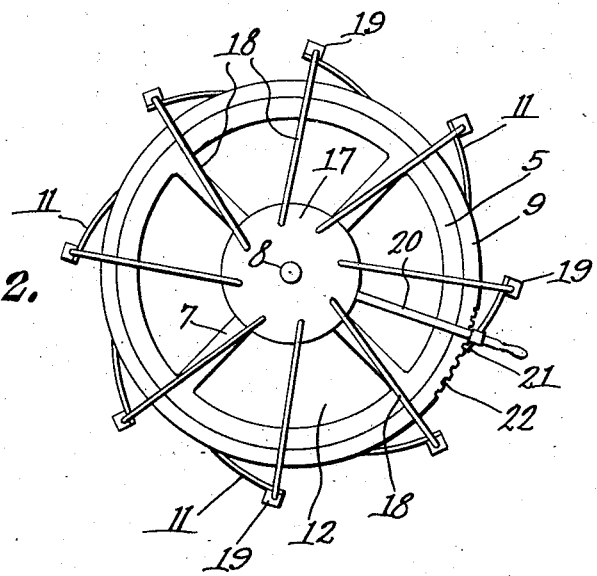
Figure 2 is a plan view thereof.
Figure 3:
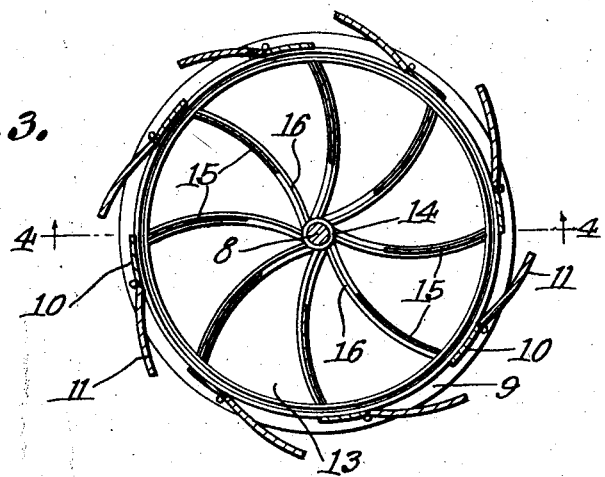
Figure 3 is a sectional view taken on line 3—3 of Figure 1.
Figure 4:
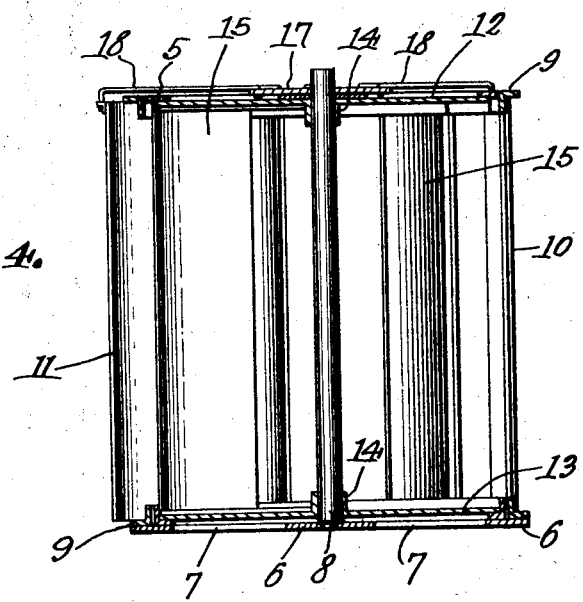
Figure 4 is a sectional view taken on line 4—4 of Figure 3.

As illustrated by Figure 2, a relatively small disk 17 is rotatably mounted at the upper end of the shaft 8 and is provided with a plurality of openings arranged adjacent to its periphery which openings receive the right angled end portions of the connecting rods 18, the outer ends of the rods 18 extending through openings formed in the angle irons 19 secured adjacent to the outer upper ends of the movable blades 11 to the end that as the disk 17 is rotated, or adjusted, the blades 11 are moved towards and away from the inner portion of the wind-wheel, and thereby adjusting or regulating the amount of air passing into the outer casing.

The reference character 20 indicates an adjusting lever which has connection with the disk 17 and has a pawl 21 adapted to engage the teeth 22 of the upper circular angle bar so that the disk 17 may be held in various positions of adjustment to accomplish its purpose.

I claim:

In a wind-wheel, an outer casing embodying an upper circular member and a lower circular member, bars for connecting the circular members, hinged closures connected with the bars, means for adjusting the closures simultaneously to move them to their open or closed positions, an inner rotary member embodying a vertical tube, a vertical tubular bearing, curved blades connected with the tubular bearing, and extending to points adjacent to the circular members, and said blades having openings adjacent to the tubular bearing to allow air to pass therethrough, and a supporting shaft positioned in the tubular bearing.

In testimony that I claim the foregoing as my own, I have hereto affixed my signature.

MARTIN L. WEBB.